US010257194B2

(12) United States Patent
Dabbiere et al.

(10) Patent No.: US 10,257,194 B2
(45) Date of Patent: *Apr. 9, 2019

(54) DISTRIBUTION OF VARIABLY SECURE RESOURCES IN A NETWORKED ENVIRONMENT

(71) Applicant: Air Watch, LLC, Atlanta, GA (US)

(72) Inventors: Alan Dabbiere, McLean, VA (US); Erich Stuntebeck, Marietta, GA (US)

(73) Assignee: AIRWATCH LLC, Atlanta, GA (US)

( * ) Notice: Subject to any disclaimer, the term of this patent is extended or adjusted under 35 U.S.C. 154(b) by 74 days.

This patent is subject to a terminal disclaimer.

(21) Appl. No.: 13/830,708

(22) Filed: Mar. 14, 2013

(65) Prior Publication Data

US 2013/0212650 A1      Aug. 15, 2013

Related U.S. Application Data

(63) Continuation-in-part of application No. 13/623,627, filed on Sep. 20, 2012, now Pat. No. 9,705,813, which is a continuation-in-part of application No. 13/396,356, filed on Feb. 14, 2012, now Pat. No. 9,680,763.

(51) Int. Cl.
*H04L 29/06* (2006.01)
(52) U.S. Cl.
CPC ............ *H04L 63/10* (2013.01); *H04L 63/105* (2013.01)
(58) Field of Classification Search
CPC .............................. H04L 63/10; H04L 63/105
USPC ............................................................ 726/4
See application file for complete search history.

(56) References Cited

U.S. PATENT DOCUMENTS

| 5,864,683 | A | 1/1999 | Boebert et al. |
| 5,928,329 | A | 7/1999 | Clark et al. |
| 5,961,590 | A | 10/1999 | Mendez et al. |

(Continued)

FOREIGN PATENT DOCUMENTS

| WO | 2012098596 | 7/2012 |
| WO | 2012098596 A1 | 7/2012 |

OTHER PUBLICATIONS

International Searching Authority, ISR and Written Opinion of the ISA in PCT, US2013/058530, dated Sep. 6, 2013.

(Continued)

*Primary Examiner* — Kambiz Zand
*Assistant Examiner* — Aubrey H Wyszynski
(74) *Attorney, Agent, or Firm* — Thomas | Horstemeyer, LLP; Arvind R. Reddy; Jason M. Perilla

(57) ABSTRACT

A method of receiving a request to access a plurality of resources and determining whether a first resource of the plurality of resources is associated with a different authorization requirement than at least one second resource of the plurality of resources. In response to determining that the first resource of the plurality of resources is associated with a different authorization requirement than the at least one second resource of the plurality of resources, determining whether the request includes the authorization requirement for the first resource and the authorization requirement for the second resource. In response to determining that the request includes the authorization requirement for the first resource and the authorization requirement for the second resource, providing access to the first resource and the at least one second resource.

18 Claims, 7 Drawing Sheets

(56) References Cited

U.S. PATENT DOCUMENTS

| | | | |
|---|---|---|---|
| 5,974,238 A | 10/1999 | Chase, Jr. | |
| 6,023,708 A | 2/2000 | Mendez et al. | |
| 6,085,192 A | 7/2000 | Mendez et al. | |
| 6,131,096 A | 10/2000 | Ng et al. | |
| 6,131,116 A | 10/2000 | Riggins et al. | |
| 6,151,606 A | 11/2000 | Mendez | |
| 6,233,341 B1 | 5/2001 | Riggins | |
| 6,269,369 B1 | 7/2001 | Robertson | |
| 6,463,470 B1 | 10/2002 | Mohaban et al. | |
| 6,560,772 B1 | 5/2003 | Slinger | |
| 6,578,069 B1 | 6/2003 | Hopmann et al. | |
| 6,606,662 B2 | 8/2003 | Nagasaki | |
| 6,694,335 B1 | 2/2004 | Hopmann et al. | |
| 6,708,221 B1 | 3/2004 | Mendez et al. | |
| 6,714,859 B2 | 3/2004 | Jones | |
| 6,726,106 B1 | 4/2004 | Han et al. | |
| 6,727,856 B1 | 4/2004 | Hill | |
| 6,741,232 B1 | 5/2004 | Siedlikowski et al. | |
| 6,741,927 B2 | 5/2004 | Jones | |
| 6,766,454 B1 | 6/2004 | Riggins | |
| 6,779,118 B1 | 8/2004 | Ikudome et al. | |
| 6,904,359 B2 | 6/2005 | Jones | |
| 6,965,876 B2 | 11/2005 | Dabbiere | |
| 6,995,749 B2 | 2/2006 | Friend | |
| 7,032,181 B1 | 4/2006 | Farcasin | |
| 7,039,394 B2 | 5/2006 | Bhaskaran | |
| 7,039,679 B2 | 5/2006 | Mendez et al. | |
| 7,064,688 B2 | 6/2006 | Collins et al. | |
| 7,092,943 B2 | 8/2006 | Roese et al. | |
| 7,184,801 B2 | 2/2007 | Farcasia | |
| 7,191,058 B2 | 3/2007 | Laird et al. | |
| 7,203,959 B2 | 4/2007 | Nachenberg et al. | |
| 7,225,231 B2 | 5/2007 | Mendez et al. | |
| 7,228,383 B2 | 6/2007 | Friedman et al. | |
| 7,275,073 B2 | 9/2007 | Ganji et al. | |
| 7,284,045 B1 | 10/2007 | Marl et al. | |
| 7,287,271 B1 | 10/2007 | Riggins | |
| 7,308,703 B2 | 12/2007 | Wright et al. | |
| 7,310,535 B1 | 12/2007 | MacKenzie et al. | |
| 7,350,229 B1* | 3/2008 | Lander | H04L 63/0815 709/225 |
| 7,353,533 B2 | 4/2008 | Wright et al. | |
| 7,363,349 B2 | 4/2008 | Friedman et al. | |
| 7,363,361 B2 | 4/2008 | Tewari et al. | |
| 7,373,517 B1 | 5/2008 | Riggins | |
| 7,398,393 B2 | 7/2008 | Mont et al. | |
| 7,437,752 B2 | 10/2008 | Heard et al. | |
| 7,444,375 B2 | 10/2008 | McConnell et al. | |
| 7,447,506 B1 | 11/2008 | MacKenzie et al. | |
| 7,447,799 B2 | 11/2008 | Kushner | |
| 7,475,152 B2 | 1/2009 | Chan et al. | |
| 7,539,665 B2 | 5/2009 | Mendez | |
| 7,565,314 B2 | 7/2009 | Borgeson et al. | |
| 7,590,403 B1 | 9/2009 | House et al. | |
| 7,594,224 B2 | 9/2009 | Patrick et al. | |
| 7,603,547 B2 | 10/2009 | Patrick et al. | |
| 7,603,548 B2 | 10/2009 | Patrick et al. | |
| 7,603,703 B2 | 10/2009 | Craft et al. | |
| 7,617,222 B2 | 11/2009 | Coulthard et al. | |
| 7,620,001 B2 | 11/2009 | Ganji | |
| 7,620,392 B1 | 11/2009 | Maurya et al. | |
| 7,650,491 B2 | 1/2010 | Craft et al. | |
| 7,660,902 B2 | 2/2010 | Graham et al. | |
| 7,665,118 B2 | 2/2010 | Mann et al. | |
| 7,665,125 B2 | 2/2010 | Heard et al. | |
| 7,685,645 B2 | 3/2010 | Doyle et al. | |
| 7,702,322 B1 | 4/2010 | Maurya et al. | |
| 7,702,785 B2 | 4/2010 | Bruton, III et al. | |
| 7,735,112 B2 | 6/2010 | Kim et al. | |
| 7,735,122 B1 | 6/2010 | Johnson et al. | |
| 7,739,334 B1 | 6/2010 | Ng et al. | |
| 7,752,166 B2 | 7/2010 | Quinlan et al. | |
| 7,788,382 B1 | 8/2010 | Jones et al. | |
| 7,792,297 B1 | 9/2010 | Piccionelli et al. | |
| 7,840,631 B2 | 11/2010 | Farcasiu | |
| 7,865,469 B2 | 1/2011 | Hopmann et al. | |
| 7,890,091 B2 | 2/2011 | Puskoor et al. | |
| 7,895,296 B1 | 2/2011 | Dayan | |
| 7,912,896 B2 | 3/2011 | Wolovitz et al. | |
| 7,917,641 B2 | 3/2011 | Crampton | |
| 7,970,386 B2 | 6/2011 | Bhat et al. | |
| 8,001,082 B1 | 8/2011 | Muratov | |
| 8,012,219 B2 | 9/2011 | Mendez et al. | |
| 8,041,776 B2 | 10/2011 | Friedman et al. | |
| 8,046,823 B1 | 10/2011 | Begen et al. | |
| 8,060,074 B2 | 11/2011 | Danford et al. | |
| 8,069,144 B2 | 11/2011 | Quinlan et al. | |
| 8,078,157 B2 | 12/2011 | Maurya et al. | |
| 8,094,591 B1 | 1/2012 | Hunter et al. | |
| 8,117,344 B2 | 2/2012 | Mendez et al. | |
| 8,127,133 B2 | 2/2012 | Cross et al. | |
| 8,150,431 B2 | 4/2012 | Wolovitz et al. | |
| 8,166,106 B2 | 4/2012 | Biggs et al. | |
| 8,407,345 B2 | 3/2013 | Lim | |
| 8,601,102 B1 | 12/2013 | Lee et al. | |
| 8,689,281 B2 | 4/2014 | Balinsky et al. | |
| 8,769,605 B2 | 7/2014 | Kaufmann et al. | |
| 8,875,222 B1 | 10/2014 | Chang et al. | |
| 9,167,031 B2* | 10/2015 | Takashima | H04L 67/2857 |
| 9,516,066 B2 | 12/2016 | Brannon et al. | |
| 9,680,763 B2* | 6/2017 | Marshall | H04L 47/70 |
| 2001/0047335 A1 | 11/2001 | Arndt et al. | |
| 2002/0013721 A1 | 1/2002 | Dabbiere et al. | |
| 2002/0055967 A1 | 5/2002 | Coussement | |
| 2003/0110084 A1 | 6/2003 | Eberhard et al. | |
| 2003/0172166 A1 | 9/2003 | Judge et al. | |
| 2003/0204716 A1 | 10/2003 | Rockwood et al. | |
| 2004/0019626 A1 | 1/2004 | Shepherd et al. | |
| 2004/0123153 A1 | 6/2004 | Wright et al. | |
| 2004/0181687 A1 | 9/2004 | Nachenberg et al. | |
| 2004/0224703 A1 | 11/2004 | Takaki et al. | |
| 2005/0246192 A1 | 11/2005 | Jauffred et al. | |
| 2005/0283614 A1 | 12/2005 | Hardt | |
| 2006/0130139 A1 | 6/2006 | Sobel et al. | |
| 2006/0190984 A1 | 8/2006 | Heard et al. | |
| 2007/0033397 A1 | 2/2007 | Phillips, II et al. | |
| 2007/0136492 A1 | 6/2007 | Blum et al. | |
| 2007/0136579 A1 | 6/2007 | Levy et al. | |
| 2007/0156897 A1 | 7/2007 | Lim | |
| 2007/0174433 A1 | 7/2007 | Mendez et al. | |
| 2007/0192484 A1* | 8/2007 | Yamaoka | H04L 63/08 709/225 |
| 2007/0288637 A1 | 12/2007 | Layton et al. | |
| 2008/0072276 A1 | 3/2008 | Pouliot | |
| 2008/0133712 A1 | 6/2008 | Friedman et al. | |
| 2008/0134296 A1 | 6/2008 | Amitai et al. | |
| 2008/0134305 A1 | 6/2008 | Hinton et al. | |
| 2008/0201453 A1 | 8/2008 | Assenmacher | |
| 2009/0036111 A1 | 2/2009 | Danford et al. | |
| 2009/0061890 A1* | 3/2009 | Andreasson | H04M 1/72525 455/456.1 |
| 2009/0138937 A1 | 5/2009 | Erlingsson et al. | |
| 2009/0144632 A1 | 6/2009 | Mendex | |
| 2009/0198997 A1 | 8/2009 | Yeap et al. | |
| 2009/0222880 A1 | 9/2009 | Mayer et al. | |
| 2009/0249440 A1 | 10/2009 | Platt et al. | |
| 2009/0260064 A1 | 10/2009 | McDowell et al. | |
| 2009/0300739 A1 | 12/2009 | Nice et al. | |
| 2009/0307362 A1 | 12/2009 | Mendez et al. | |
| 2010/0005125 A1 | 1/2010 | Mendez et al. | |
| 2010/0005157 A1 | 1/2010 | Mendez et al. | |
| 2010/0005159 A1 | 1/2010 | Ishiguro | |
| 2010/0005195 A1 | 1/2010 | Mendez et al. | |
| 2010/0023630 A1 | 1/2010 | Mendez et al. | |
| 2010/0100641 A1 | 4/2010 | Quinlan et al. | |
| 2010/0120450 A1 | 5/2010 | Herz | |
| 2010/0144323 A1 | 6/2010 | Collins et al. | |
| 2010/0146269 A1 | 6/2010 | Baskaran | |
| 2010/0150342 A1 | 6/2010 | Richards et al. | |
| 2010/0212016 A1 | 8/2010 | Dubhashi et al. | |
| 2010/0254410 A1 | 10/2010 | Collins | |
| 2010/0268844 A1 | 10/2010 | Quinlan et al. | |
| 2010/0273456 A1 | 10/2010 | Wolovitz et al. | |
| 2010/0274910 A1 | 10/2010 | Ghanaie-Sichanie et al. | |

(56) References Cited

U.S. PATENT DOCUMENTS

| | | |
|---|---|---|
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2010/0325710 A1 | 12/2010 | Etchegoyen |
| 2011/0004941 A1 | 1/2011 | Mendez et al. |
| 2011/0082900 A1 | 4/2011 | Nagpal et al. |
| 2011/0113062 A1 | 5/2011 | Quinlan et al. |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0270799 A1 | 7/2011 | Muratov |
| 2011/0202589 A1 | 8/2011 | Piernot et al. |
| 2011/0202987 A1 | 8/2011 | Bauer-Hermann et al. |
| 2011/0225252 A1 | 9/2011 | Bhat et al. |
| 2011/0276805 A1 | 11/2011 | Nagpal et al. |
| 2011/0277013 A1 | 11/2011 | Chinta |
| 2011/0296186 A1 | 12/2011 | Wong et al. |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0102392 A1 | 4/2012 | Reesman et al. |
| 2012/0150577 A1 | 6/2012 | Berg et al. |
| 2012/0198547 A1 | 8/2012 | Fredette et al. |
| 2012/0246719 A1 | 9/2012 | Bhamidipaty et al. |
| 2013/0045729 A1 | 2/2013 | Haik et al. |
| 2013/0081101 A1 | 3/2013 | Baer et al. |
| 2013/0152169 A1 | 6/2013 | Stuntebeck |
| 2013/0254401 A1* | 9/2013 | Marshall .............. G06F 21/6218 709/226 |

OTHER PUBLICATIONS

U.S. Appl. No. 13/922,665 entitled, "Securing Access to Resources on a Network " filed Jun. 20, 2013.
Non-Final Office Action cited in U.S. Appl. No. 13/316,073 dated Jan. 18, 2013.
International Searching Authorit, "ISR and Written Opinion of the ISA in PCT/US2013/058530" dated Sep. 20, 2012.
Office Action dated Jan. 23, 2015 in co-pending, related U.S. Appl. No. 13/922,665, filed Jun. 20, 2013.
OA dated Jul. 14, 2015, for U.S. Appl. No. 13/623,627.
OA dated Aug. 5, 2015, for U.S. Appl. No. 13/922,665.
Office Action dated Jan. 4, 2016, for U.S. Appl. No. 13/922,665.
Office Action dated Jan. 5, 2016, for U.S. Appl. No. 13/623,627.
Office Action dated May 4, 2016 for U.S. Appl. No. 13/623,627.
Non-Final Office Action in related U.S. Appl. No. 15/597,435, dated Aug. 11, 2017.
Office Action dated Mar. 13, 2017 for U.S. Appl. No. 15/341,600.

* cited by examiner

DISTRIBUTION OF VARIABLY SECURE RESOURCES IN A NETWORKED ENVIRONMENT

CROSS-REFERENCE TO RELATED APPLICATIONS

This application is a continuation-in-part of U.S. patent application Ser. No. 13/623,627 filed Sep. 20, 2012, entitled "CONTROLLING DISTRIBUTION OF RESOURCES ON A NETWORK," which is a continuation-in-part of U.S. patent application Ser. No. 13/396,356 filed Feb. 14, 2012, entitled "CONTROLLING ACCESS TO RESOURCES ON A NETWORK," the entire disclosures of which are hereby incorporated by reference, for all purposes, as if fully set forth herein.

BACKGROUND

Controlling access to, and distribution of, enterprise resources, such as documents, databases, and executable applications, in a networked environment is critical to ensure that only authorized network-connected devices and/or users may gain access to sensitive information. Additionally, some documents may be more sensitive than others, requiring different procedures and/or rules to protect different resources. Finally, sensitivity of a given resource may be dynamic, changing over time in response to any number of factors, and any system and/or method to control such a resource may need to be responsive to such dynamic sensitivity.

BRIEF DESCRIPTION

The present disclosure relates to systems and methods of controlling distribution of variably secure resources in a network environment. In certain embodiments, a distribution server may receive, from a client device, a request to access certain resources. The request may include a device identifier for identifying the client device from which the request was issued and, optionally, at least one user credential identifying the user of the client device. If the request includes a device identifier but not at least one user credential, access may be granted to unsecure resources if the device identifier is authenticated. If the request includes a device identifier and user credential pairing, access may be granted to secure resources if both the device identifier and the user credential(s) are authenticated.

If the client device and/or the user is/are authorized to access the distribution service, the distribution service may identify which of a plurality of resource grouping identifiers are associated with the client device and/or the user. At least one resource may then be identified as being associated with the identified resource grouping identifier(s). Unsecure and/or less secure resources may be associated with resource grouping identifiers associated with a device identifier but not at least one user credential. Secure and/or more secure resources may be associated with resource grouping identifiers associated with device identifier and user credential pairings. Optionally, a determination may then be made as to whether the client device complies with a plurality of distribution rules associated with each one and/or the group of the identified resources. The identified resources may be provided to the client device, and/or the client device may otherwise be granted access to such resources, based at least in part on whether the client device complies with the distribution rules associated with the identified resources.

In some embodiments, at least one computer readable medium is provided with instructions stored thereon for implementing the methods performed by the distribution service for controlling distribution of variably secure resources. The instructions may be executable by at least one processor of a distribution server and/or other processor-driven device to perform the distribution service methods.

In some embodiments, a client device is configured for accessing variably secure resources in a network environment. The client device may be configured with a client side application that sends, to a distribution service, a request to access the distribution service. The request may include a device identifier identifying the client device. Optionally, the request may also include at least one user credential identifying the user of the client device. If the request includes a device identifier but not at least one user credential, the client device may receive and/or be provided access to unsecure resources if the device identifier is authenticated. If the request includes a device identifier and user credential pairing, the client device may receive and/or be provided access to secure resources if both the device identifier and the user credential(s) are authenticated.

In some embodiments, at least one computer readable medium is provided with instructions stored thereon for implementing the methods performed by the client side application for accessing variably secure resources. The instructions may be executable by at least one processor of a client device to perform the distribution service methods.

BRIEF DESCRIPTION OF THE DRAWINGS

Many aspects of the present disclosure can be better understood with reference to the following diagrams. The drawings are not necessarily to scale, emphasis instead being placed upon clearly illustrating certain features of the disclosure. Moreover, in the drawings, like reference numerals designate corresponding parts throughout the several views.

DETAILED DESCRIPTION

Figure 1:
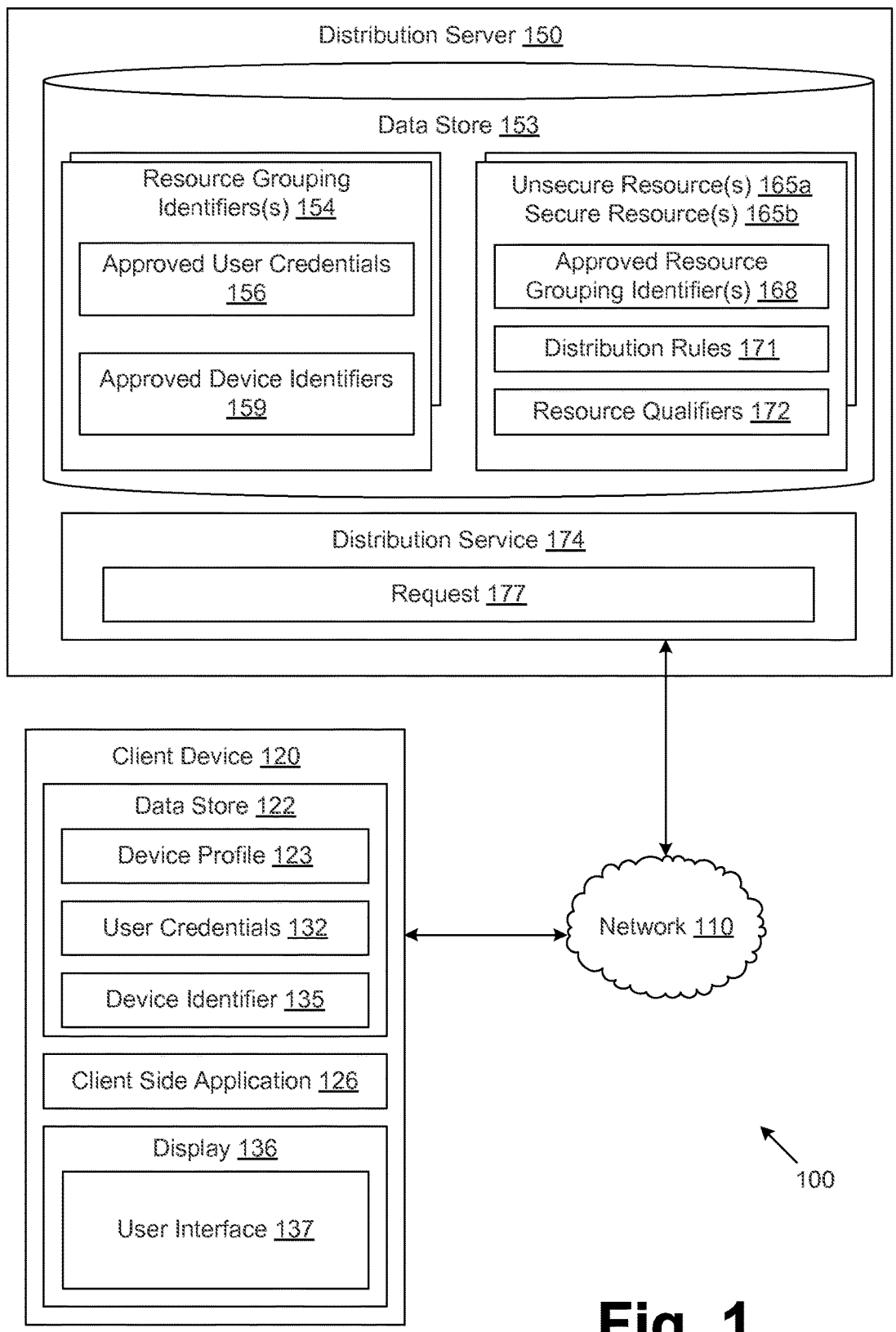
FIG. 1 is a block diagram of a networked environment according to an example embodiment.

The ensuing description describes managing and controlling the distribution of variably secure resources in a network. The following description is not intended to limit the scope, applicability and/or configuration of the embodiments herein. Rather, the ensuing description is intended to provide those skilled in the art with an enabling description for implementing at least one example embodiment. It will be understood that various changes may be made in the function(s) and arrangement(s) of elements of the various embodiments without departing from the spirit and scope of the appended claims. For example, any particular detail discussed in regard to one embodiment may or may not be present in any other separately described embodiment.

In certain embodiments, an example system comprises a distribution server and a plurality of client devices configured as described herein. In some embodiments, a distribution service executed by the distribution server serves up resources to a client device if the client device and/or a user of the client device are authorized to receive the resources. The distribution service first determines whether the user and/or client device are authorized to communicate with the distribution service based at least in part on a plurality of authorization rules.

Upon determining that the user and/or the client device is/are authorized, the distribution service determines a plurality of resource grouping identifiers associated with the user and/or client device. For instance, each resource may be associated with at least one resource grouping identifier. Resource grouping identifiers are used to identify a grouping (i.e., at least one) of resources that may be provided to authorized users and/or client devices. The distribution service then identifies a plurality of resources that are associated with each one of the resource grouping identifiers and serves up the identified resources to the user of the client device if the client device complies with any distribution rules associated with each one and/or the group of the identified resources. For instance, the distribution service may determine that the client device complies with the distribution rules based at least in part on data selected from a device profile of the client device.

In some embodiments, the resources referenced herein may include any electronic data, such as databases, applications, text files, word processor files, spreadsheet files, presentation files, graphic files, audio files, photographic files, video files, applications and application files, and/or the like. More specifically, resources may include: data files, audio files, video files, three-dimensional image files, raster image files, vector image files, page layout files, spreadsheet files, database files, executable files, CAD files, web files, plug-in files, font files, system files, settings files, encoded files, compressed files, disk image files, developer files, backup files, and/or any other files.

FIG. 1 illustrates a networked environment 100 according to various embodiments. The networked environment 100 includes a network 110, a client device 120, and a distribution server 150. The network 110 may be or include, for example, any type of wireless network such as a wireless local area network (WLAN), a wireless wide area network (WWAN), and/or any other type of wireless network now known and/or later developed. Additionally, the network 110 may be or include the Internet, intranets, extranets, microwave networks, satellite communications, cellular systems, PCS, infrared communications, global area networks, and/or other suitable networks, etc., and/or any combination of two or more such networks. In some embodiments, the network 110 facilitates transmission of resources 165 between at least one client device 120 and a distribution server 150.

The client device 120 may be a desktop computer, a laptop computer, a personal digital assistant, a cellular telephone, a set-top box, a music player, a web pad, a tablet computer system, a game console, and/or another device with like capability. The client device 120 may include a wired network connectivity component (not shown in FIG. 1), for example, an Ethernet network adapter, a modem, and/or the like. The client device 120 may further include a wireless network connectivity interface (not shown in FIG. 1), for example, a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like. The client device 120 may be operable to communicate via wired connection with the distribution server 150 with the aid of the wired network connectivity component. The client device 120 may be further operable to communicate wirelessly with the distribution server 150 with the aid of the wireless network connectivity component. Additionally, the client device 120 may further comprise a memory for storing data and applications, a processor for executing applications stored in memory, and a local interface such as a bus, as will be described with respect to FIG. 10.

Additionally, the client device 120 may store in a data store 122 a device profile 123, user credentials 132, a device identifier 135, and other data. In some embodiments, the device profile 123 may represent hardware, software, and security attributes that describe the client device 120. For instance, the device profile 123 may represent hardware specifications of the client device 120, version and configuration information of various software programs and hardware components installed on the client device 120, transport protocols enabled on the client device 120, version and usage information of various other resources stored on the client device 120, and/or any other attributes associated with the state of the client device 120. Additionally, the device profile 123 may include data indicating a date of a last virus scan of the client device 120, a date of a last access by an IT representative, a date of a last access by the distribution server 150, a date of a last service by the IT representative, and/or any other data indicating a date of last maintenance.

The user credentials 132 may uniquely identify the user of the client device 120. For example, the user credentials 132 may include a username, a password, and/or biometric data related to facial recognition, retina recognition, fingerprint recognition, and the like. The device identifier 135 may uniquely identify the client device 120. For example, the device identifier 135 may be a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, and/or any combination of two or more such hardware identifiers. Additionally, the device identifier 135 may be represented by a unique software identifier such a token and/or certificate, based at least in part on the aforementioned unique hardware identifiers.

The client device 120 may further be configured to execute various applications. For example, the client device 120 may be configured to execute applications such as web browsing applications, email applications, instant messaging applications, and/or other applications capable of receiving and/or rendering resources 165 on a display 136 associated with the client device 120. Any applications capable of receiving and/or rendering resources on a display 136 is generally referred to herein as a "client side application" 126. The client side application 126 may be stored in the memory of the client device 120.

The client side application 126 may be executed to transmit requests to access resources 165 to the distribution server 150 and render a user interface 137 on the display 136 that provides access to the resources 165. In particular, the resources 165 may be presented in a user interface 137 by decompressing compressed files and presenting the uncompressed files, mounting disk image files and presenting the mounted image files, running executable files and presenting the executed files, by enabling a data search of the resources 165 and presenting the featured output in a user interface, by calling on another application on the client device 120 to respond to data links contained within the resources 165, and/or by transmitting a part or the whole of the resources 165 to another application on the client device 120. Furthermore, a client side application 126 may be executed to present a single resource 165 and/or a series of resources 165 in a comprehensive manner, for instance, presenting photograph files in a slideshow presentation. Additionally, the client side application 126 may be executed to render an environment that presents an array of resources 165 in a single view, such as a category-based tree and/or outline format, based at least in part on a resource qualifier 172 associated with the resources 165. In some embodiments, the client side application 126 may be a secure container program that may be authorized to receive and render selected resources 165, as described herein. In some embodiments, the client side application 126 may be a browser configured to be executed as described herein.

In some embodiments, the resource qualifier 172 may be or include metadata that describes and/or regulates the use of the respective resource 165. For example, a resource qualifier may include categories/sub-categories to which the resource 165 belongs, an indication that the resource 165 is considered a favorite, an indication of whether the resource 165 is privately owned, publicly owned, and/or enterprise-owned, an indication of whether the resource 165 is confidential, an indication of whether the resource 165 is password protected, an indication of the historical version of the resource 165, a description of the resource 165, at least one comment regarding the resource 165, an indication of the size and format of the resource 165, an indication of the download priority associated with the resource 165, an indication of the expiration date associated with the resource 165, an indication of the effective date associated with the resource 165, an indication of the ownership of the resource 165, an indication of the managing party of the resource 165, and/or the like, and/or any combination of these and other resource qualifiers.

The client side application 126 may also facilitate the modification of resources 165 provided by the distribution service 174 and the modification of data associated with the provided resources 165, unless such actions are prohibited by the distribution service 174 and/or any applicable resource qualifiers. For example, the client side application 126 may include functionality for adding content to the existing resources 165, removing content from the existing resources 165, altering the content of existing resources 165, adding resource qualifiers 172 associated with the existing resources 165, and/or the like, and/or any combination of manipulations of the resources 165.

In some cases, the client side application 126 may further be executed to add new resources 165 to be hosted by the distribution server 150. For example, a user having administrator-level user credentials 132 may manipulate the user interface 137 to transfer copies of resources 165 locally stored on the client device 120 to the distribution server 150 to be included in the data store 153. In some embodiments, the user of the client device 120 may initiate upload of at least one resource 165 via the user interface 137 rendered by the client side application 126, as can be appreciated. In addition, the appropriately credentialed user may indicate approved resource grouping identifiers 168 to be assigned to client device(s) 120 and/or users that are permitted to access the uploaded resource 165 and specify distribution rules 171 that are required to be complied with in order to access the uploaded resource 165, as will be described. In some embodiments, a user without administrator-level user credentials 132 may manipulate the user interface 137 to transfer local copies of personal resources 165 to the distribution server 150, if such actions are permitted. In this example, the resources qualifiers 172 associated with the personal resources 165 may be configured by default to restrict access by any other user.

Additionally, the client side application 126 may be configured to optionally restrict access to the resources 165 by other applications executed by the client device 120, thereby preventing access to the resources 165 from an application other than the client side application 126. In some embodiments, the client side application 126 may monitor network traffic between the client device 120 and the distribution server 150 and identify any data being transmitted between an application executed by the client device 120 other than the client side application 126 and the distribution server 150. The client side application 126 may then determine whether a resource 165 is being provided to an application other than the client side application 126 executed by the client device 120 and intercept and/or block the incoming resource 165. In some embodiments, the client side application 126 may then allow the intercepted resource 165 to be accessible to the user via a user interface 137 rendered by the client side application 126. In some embodiments, the client side application 126 may deny access to the intercepted resource 165 by any other application on the client device 120. Additionally, the client side application 126 may be executed to call on other services associated with the resources 165 that are executed on the distribution server 150 and/or another server or device accessible to the client side application 126, for instance, a technical support service that may be executed on the distribution server 150.

The distribution server 150 may comprise, for example, a server computer and/or any other system providing resource and service distribution capability. Alternatively, a plurality of distribution servers 150 may be employed that are arranged, for example, in at least one server bank and/or computer banks or other arrangements. For example, a plurality of distribution servers 150 together may comprise a cloud computing resource, a grid computing resource, and/or any other distributed computing arrangement. Such distribution servers 150 may be located in a single installation and/or may be distributed among many different geographic locations. For purposes of convenience, the distribution server 150 is referred to herein in the singular. Even though the distribution server 150 is referred to in the singular, it is understood that a plurality of distribution servers 150 may be employed in the arrangements as descried herein.

Certain applications and/or other functionality may be executed in the distribution server 150 according to certain embodiments. Also, certain data is stored in a data store 153 that is part of and/or otherwise accessible to the distribution server 150. The illustrated data store 153 may be representative of a plurality of data stores, as can be appreciated. The data stored in the data store 153, for example, is associated with the operation of the applications and/or functional entities described herein. The data store 153 may utilize strong encryption standards to protect the resources 165 from unauthorized access. For example, the data store 153 may utilize SHA-1 (Standard Hash Algorithm) and/or a similar strong encryption standard commonly utilized for server-side data storage.

The components executed on the distribution server 150, for example, include the distribution service 174 and other applications, services, processes, systems, engines, and/or functionality not disclosed in detail herein. The distribution service 174 is executed to provide resources 165 stored in the data store 153 to a requesting client device 120 based on authentication of the client device and/or user and based on resource grouping identifiers 154 and distribution rules 171, as will be described. In addition, the distribution service 174 may also accept new resources 165 provided by an authorized user of the client device 120, and previously provided resources 165 modified by the authorized user of the client device 120, as will be described.

The data store 153 may include resource grouping identifiers 154, resources 165, and/or other data. The resource grouping identifiers 154 may represent unique identifiers for previously determined resource groupings and may be used to determine which resources 165 are served up to the user of the client device 106, as will be described. For example, a resource grouping may relate to organizational groups, organizational roles, geographic locations, and/or any other type of grouping that require access to a type of resource. Each resource grouping identifier 154 may be associated with at least one of a plurality of approved user credentials 156, at least one of a plurality of approved device identifiers 159, and/or a pairing of at least one of a plurality of approved user credentials 156 and at least one of a plurality of approved device identifiers 159. In some embodiments, each approved user credential 156, approved device identifier 159, and/or combination of approved user credentials 156 and approved device identifiers 159 may be associated with more than one of the resource grouping identifiers 154. Additionally, each approved user credential 156, approved device identifier 159, and/or pairing of approved user credentials 156 and approved device identifiers 159 may be associated with a user's organizational role and/or capacity. Pairings of approved user credentials 156 and the approved device identifiers 159 may be predetermined by an IT administrator. In some embodiments, each approved user credential 156, approved device identifier 159, and/or pairing of approved user credentials 156 and the approved device identifiers 159 may be automatically associated with the resource grouping identifiers 154 based at least upon a user's pay grade, organizational level, status within the organization, and/or any other organizational factor.

Each resource 165 may be associated with a listing of approved resource grouping identifiers 168 and a plurality of distribution rules 171. In some embodiments, the listing of approved resource grouping identifiers 168 includes a plurality of resource grouping identifiers 154 that regulate access to the respective resource 165. In some embodiments, the listing of approved resource grouping identifiers 168 may be predetermined by an IT administrator. For instance, the IT administrator may specify which resource grouping identifiers 154 are permitted access to the respective resource 165.

For purposes of the present disclosure, resources 165 associated with resource grouping identifiers that are associated with a device identifier but not at least one user credential are referred to as "unsecure" and/or "less secure" resources 165a. Similarly, resources 165 associated with resource grouping identifiers that are associated with device identifier and user credential pairings are referred to herein as "secure" and/or "more secure" resources 165b.

Distribution rules 171 may be employed regulate how a user having the appropriate user credentials 132 and/or device identifiers 135 may access the respective resource 165. For example, in some embodiments, the distribution rules 171 may describe a required and/or a permitted state that an accessing client device 120 must satisfy in order for the client device 120 to be permitted access to the resource 165. The distribution rules 171 may include but are not limited to hardware requirements, software requirements, configuration requirements, maintenance requirements of a client device, and/or requirements related to the resource 165.

Additionally, in certain embodiments, hardware requirements may include requirements associated with the CPU, memory, power supply, external storage, peripherals, and/or the like. Software requirements may include requirements associated with the operating system type and version, operating system authenticity and jailbreak/rooted status, installed application types and versions, and/or the like. Configuration requirements may include requirements associated with the configuration of the hardware, software, data encryption methods, transport protocols, and/or the like. Maintenance requirements may include requirements associated with the date of last virus scan for the client device 120, the date of the last access of the client device 120 by IT, the date of last communication between the client device 120 and the distribution server 150, the date of last tune-up of the client device 120, and/or the like. Requirements related to the resource 165 may include whether the resources 165 may be rendered while the client device 120 is offline and/or not in communication with the distribution service 174, whether to permit synchronization of the resources 165 with a remote data store, whether to restrict the resources 165 from being forwarded, whether to permit storing resources 165 locally on the client device 120, and/or the like. Alternatively, the resources 165 and distribution rules 171 may be stored on another data store accessible to the client device 120 and/or other storage facility in data communication with the distribution server 150, such as an internal email server, a web-based email server, an internal file server, a third-party hosted file server, a cloud-based server, and/or a cached local data store on the client device 120.

Figure 2:
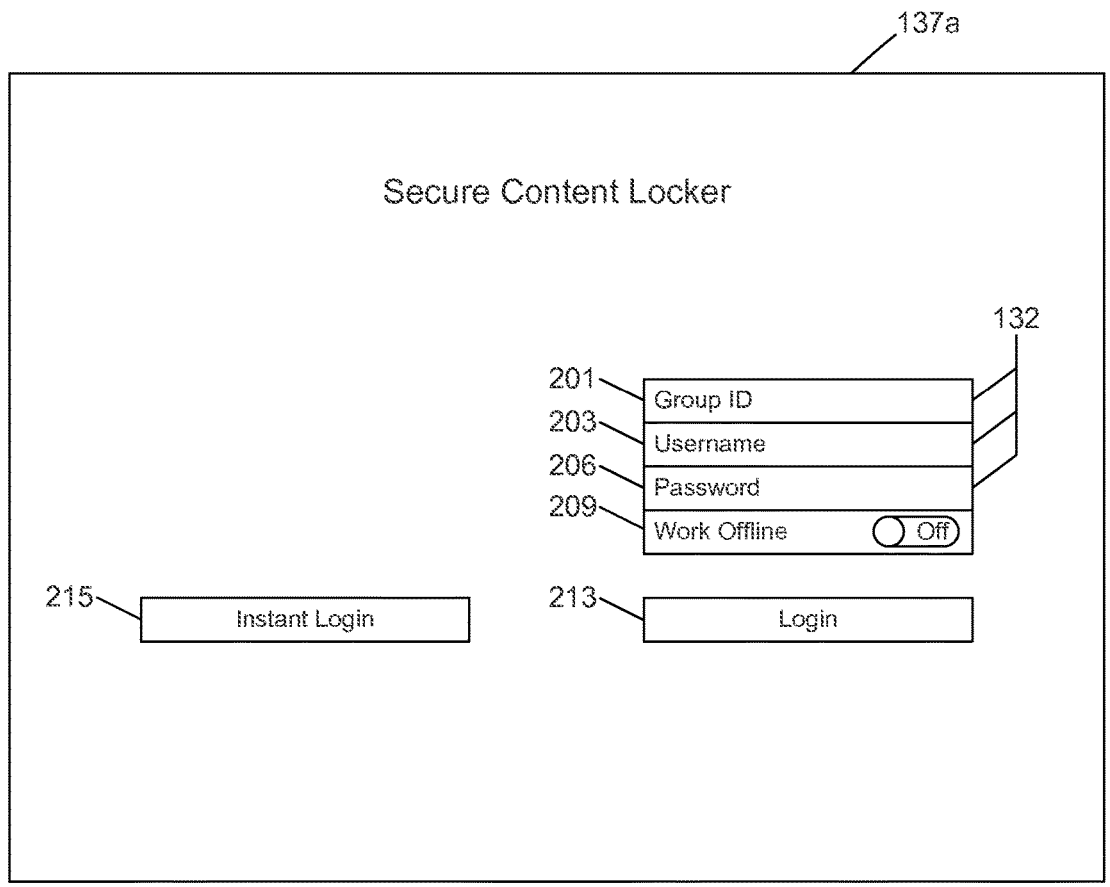
FIGS. 2-4 are example user interfaces rendered on a client device in the networked environment of FIG. 1.

A user operating a client device 120 may wish to access resources 165 stored on the distribution server 150. In some embodiments, the user may operate an input device to manipulate a user interface 137 rendered by the client side application 126 to transmit a request 177 for accessing at least one resource 165 on the distribution server 150. An example user interface 137a is shown in FIG. 2.

User interface 137a may include two mechanisms for allowing a user to submit a request to access resources 165 on distribution server 150. A first mechanism is shown as a "Login" button 213, activation of which requires input of at least one of a group ID into group ID field 201, a username into username field 203, and/or a password into password field 206 (individually and/or collectively, user credentials 132). The user may also instruct the client side application 126 to work offline via a work offline toggle 209. Working offline may still occur in some embodiments, where resources 165 are downloaded for later use by client device 120, but where continued offline use may be monitored locally per any distribution rules 171 applicable to such resources 165.

Once the required user credential(s) are provided, the user activates the login button 213 and the user credentials 132, along with a device identifier 135 that uniquely identifies client device 120, are included in a request 177 sent from client device to distribution service 174. It should be understood that a device identifier 135 and/or user credentials 132 may be automatically retrieved by the client side application 126 and populated into the appropriate fields of the user interface 137a and/or added to the request 177 sent from the client device 120 to the distribution service 174. The request 177 may also include any other relevant information necessary for the distribution service 174 to determine what resources 165 to provide to the client device, for example, information from a device profile 123 (also referred to herein as status data) which may pertain to distribution rules 171. Providing user credentials 132 and a device identifier 135 may allow the user to access any unsecure resources 165a and secure resources 165b that the user is entitled to access with the particular client device 120, and/or some subset of such resources 165a&b depending on the applicability of any associated distribution rules 171.

A second mechanism for requesting access to resources 165 on distribution server 150 is provided by an "Instant Login" button 215. Activation of the Instant Login button 215 causes the client device 120 to transmit a request 177 to the distribution service 174 for access to resources 165. In this case, the request will include a device identifier 135 but no user credentials 132. The request may also include any other relevant information necessary for distribution service 174 to determine what resources 165 to provide, for example, device status data which may pertain to distribution rules 171. This request 177 is then processed by distribution service 174. Providing a device identifier 135 but no user credentials 132 may allow the user to access only those unsecured resources 165a that the particular client device 120 is entitled to access regardless of the user. Depending on the embodiment, the accessible unsecure resources 165a may be additionally limited depending on the further applicability of distribution rules 171.

In either case, distribution service 174 receives the request 177 and determines whether client device 120 and/or user is/are authorized to access any of the resources 165 stored on and/or accessible to the distribution server 150. For instance, the distribution service 174 may use an authorization approach as described in U.S. application Ser. No. 13/316, 073 entitled "CONTROLLING ACCESS TO RESOURCES ON A NETWORK." As another example, the distribution service 174 may determine that client device 120 is authorized to access certain resources 165 via the distribution server 150 based on the user credentials 132 and/or the device identifier 135 provided with the request 177. In some embodiments, the distribution service 174 may compare the client device identifier 135 to a list of approved client device identifiers 159 and, if provided, may compare the user credential(s) 132 to a list of approved user credentials 156. If the client device identifier 135 is determined to be an approved device identifier 159, but no user credential 132 is determined to be an approved user credentials 156 (which may be because no user credential 132 was provided) the distribution service 147 will determine that the client device 120 is authorized to access at least one subset of unsecure resources 165a. On the other hand, if the client device identifier 135 is determined to be an approved device identifier 159 and the user credential 132 is determined to be an approved user credentials 156, the distribution service 147 will determine that the client device 120 is authorized to access at least one subset of secure resources 165b.

Upon determining that client device 120 is authorized to access certain resources 165 from the distribution server 150, the distribution server 150 determines which of the resources 165 to provide to the client device 120. In some embodiments, the distribution service 174 determines which resources 165 to provide based on the resource grouping identifiers 154 associated with each resource 165. For instance, the distribution service 174 may first determine which resource grouping identifiers 154 are associated with the device identifier 135 (if not user credentials are provided and/or approved) and/or which resource grouping identifiers 154 are associated the provided pairing of the user credential(s) 132 and device identifier 135. In such embodiments, the distribution service 174 may parse the listing of approved user credentials 156 and the listing of approved device identifiers 159 of each resource grouping identifier 154 to determine whether the respective resource grouping identifier 154 is associated with one and/or both of the device identifier 135 and the user credential(s) 132 (if provided).

Next, the distribution service 174 identifies a resource 165 to provide to the client device 120 based on the determined resource grouping identifiers 154. In some embodiments, the distribution service 174 identifies at least one resource 165 associated with each one of the determined resource grouping identifiers 154. In some embodiments, the distribution service 174 identifies the resource 165 if the resource 165 is associated with all of the determined resource grouping identifiers 154. Additionally, in some embodiments, the distribution service 174 identifies the resource 165 if it is associated with a threshold number of the resource grouping identifiers 154. The distribution service 174 may then provide the identified resources 165 to the client device 120 and/or provide the client device with access to such resources 165.

In some embodiments, before the identified resources 165 are (and/or access thereto is) provided to the client device 120, the distribution service 174 may additionally determine whether the client device 120 complies with any distribution rules 171 associated with the identified resources 165. For example, the distribution service 174 may determine whether some and/or all of the information stored in the device profile 123, describing the state of the client device 120, complies with the distribution rules 171 associated with the identified resources 165. As discussed above, the device profile 123 may include hardware specifications of the client device 120, software specifications of the client device 120, version information of various other components of the client device 120, and/or any other information profiling the client device 120. In some embodiments, the distribution service 174 may provide each identified resource 165 to the client device 120 and/or allow the client device 120 to access such resources if the device profile 123 complies with all of, or at least a portion of, the distribution rules 171 associated with each of the identified resources 165. Additionally, in some embodiments, the distribution service 174 may provide the identified resource(s) 165 to the client device 120 if the device profile 123 complies with at least a threshold number of the distribution rules 171 associated with each of the identified resources 165.

Responsive to a determination that the client device 120 is in a state of compliance with the distribution rules 171, the distribution service 174 may be further executed to transmit the identified resources 165 to the client device 120 and/or otherwise allow the client device to access the identified resources 165. In some embodiments, the distribution service 174 may automatically transmit the identified resources 165 to the client device 120. In some embodiments, the distribution service 174 may make the identified resources 165 available for download by the client device 120 based on a resource qualifier associated with the respective resource 165. For instance, the resource qualifier may indicate the respective resource 165 be made available for download to the client device 120. In this example, the user may transmit a request to the distribution service 174 to download the respective resource 165. In some embodiments, the distribution service 174 may permit the client device 120 to access and interact with a resource 165 that remains stored in the distribution server 150 and/or in some other network device.

In some situations, the state of the client device 120 may be modified between the time the distribution service 174 makes an identified resource 165 available for download and the time the distribution service 174 receives a request to download the identified resource 174. For example, the client device 120 may have switched connectivity from a secured network 110 to an unsecured network 110. In this embodiment, the distribution service 174 may determine for a second time, before providing access to the identified resource 165, whether the client device 120 complies with the distribution rules 171. For example, the request to download transmitted from the client device 120 may include an updated device profile 123 and/or a portion thereof. The distribution service 174 may make the second determination of whether the client device 120 complies with the distribution rules 171 based on information from the updated device profile 123. For instance, the distribution rules 171 may require that the client device 106 be connected to a secured network 110 to gain access to the resource and the second determination of compliance may reveal that the client device 120 is connected to an unsecured network 110. Responsive to the second determination that the client device 120 complies with the distribution rules 171, the distribution service 174 provides the requested resource 165. In some embodiments, all and/or part of the device profile 123 may be periodically transmitted by the client side application 126 to the distribution server 150. In this embodiment, each time the device profile 123 is transmitted to the distribution server 150, the distribution service 174 may determine whether the updated client device 120 complies with applicable distribution rules 171 using the updated device profile 123. If it is determined that the client device 120 has become noncompliant, authorization to access to certain resources 165 may be revoked and/or the client side application 126 may be instructed to discontinue displaying and/or otherwise allowing user interaction with such resources 165.

In some embodiments, the distribution service 174 may transmit the distribution rules 171 associated with each one of the identified resources 165 to the client device 120. For example, the distribution service 174 may transmit the distribution rules 171 to the client side application 126 for determining whether the client device 120 complies with the distribution rules 171. In some embodiments, the distribution service 174 may not determine whether the client device 120 complies with the distribution rules 171 of each of the identified resources 165 and instead permit the client side application 126 to make this determination. For instance, the client side application 126 may determine whether the client device 120 complies with the distribution rules 171 associated with the received resource 165 prior to rendering the received resource 165 on the display 136 and may discontinue displaying and/or otherwise allowing user interaction with such resource 165 if the client device 120 becomes noncompliant.

In some embodiments, the distribution service 174 may first transmit the distribution rules 171 to the client device 120 prior to transmitting the identified resources 165. The client side application 126 may then determine whether the client device 120 complies with the distribution rules 171, as described above. The client side application 126 may then transmit an indication back to the distribution service 174 of the compliance status. Responsive to receiving an indication from the client device 120 that the client device 120 complies with all and/or a sufficient portion of the distribution rules 171 associated with each respective resource 165, the distribution service 174 may then transmit the appropriate identified resources 165 to the client device 120 and/or otherwise allow the client device to access such resources 165. Additionally, the client side application 126 may store the distribution rules 171 in a memory associated with the client device 120, such as the data store 122. Upon subsequent requests to access the identified resource 165, the distribution service 174 may wait to receive an indication from the client side application 126 that the client device 120 complies with the distribution rules 171 associated with the requested resource 165 before transmitting the requested resource 165. For example, the client side application 126 may determine device compliance using the stored distribution rules 171 received from a previous request to access certain resources 165 before transmitting a new request for access to such resources 165.

Figure 3:
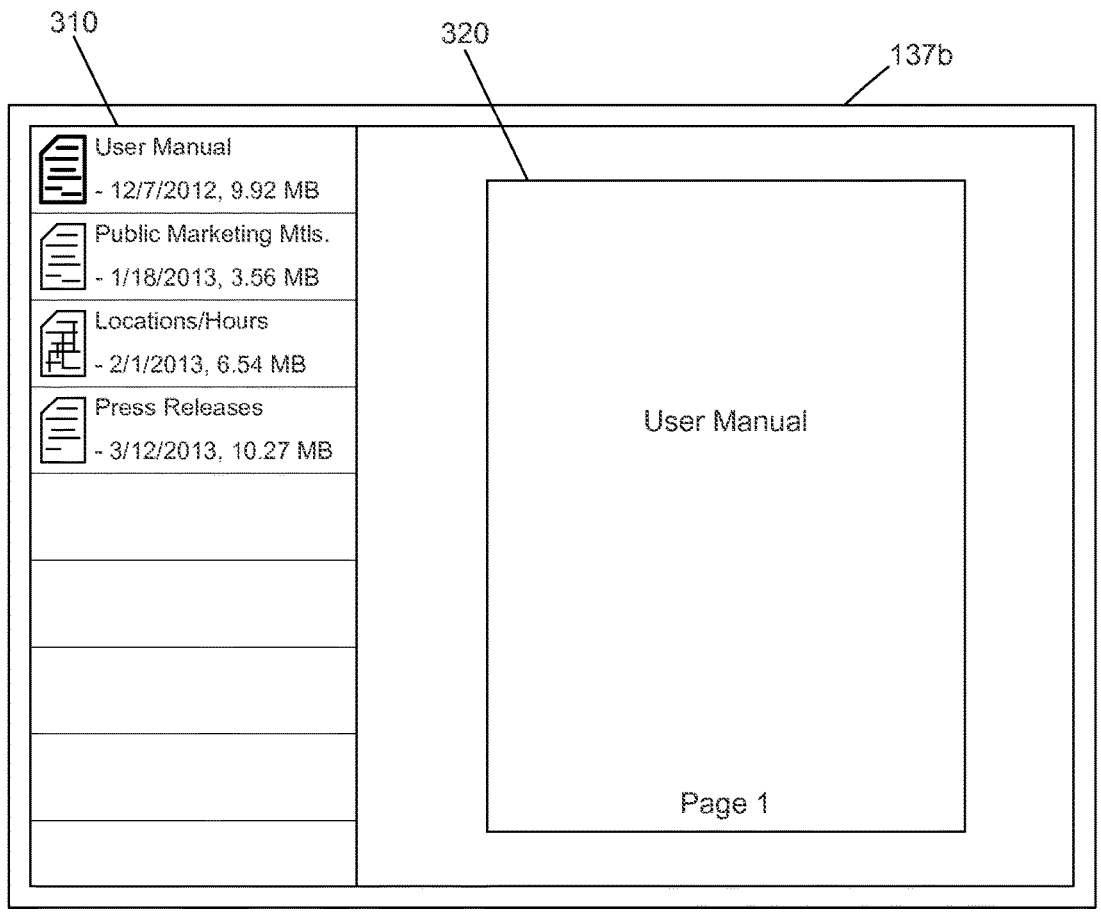

Once the distribution server 150 determines which resources 165 and/or distribution rules to provide and/or make available to the client device 120, a list of the identified resources 165 may be provided to and/or generated by the client device 120 for display. This may occur by way of a separate user interface 137b as shown in FIG. 3. Interface 137b includes a list 310 of resources 165 available to the client device 120, which may include unsecure resources 165a and/or secure resources 165b depending on whether the request 177 included the device identifier 135 and/or at least one user credential 132, as described above. The example user interface 137b may also include a display portion 320 for showing one of the resources 165 selected from list 310 by the user.

Figure 4:
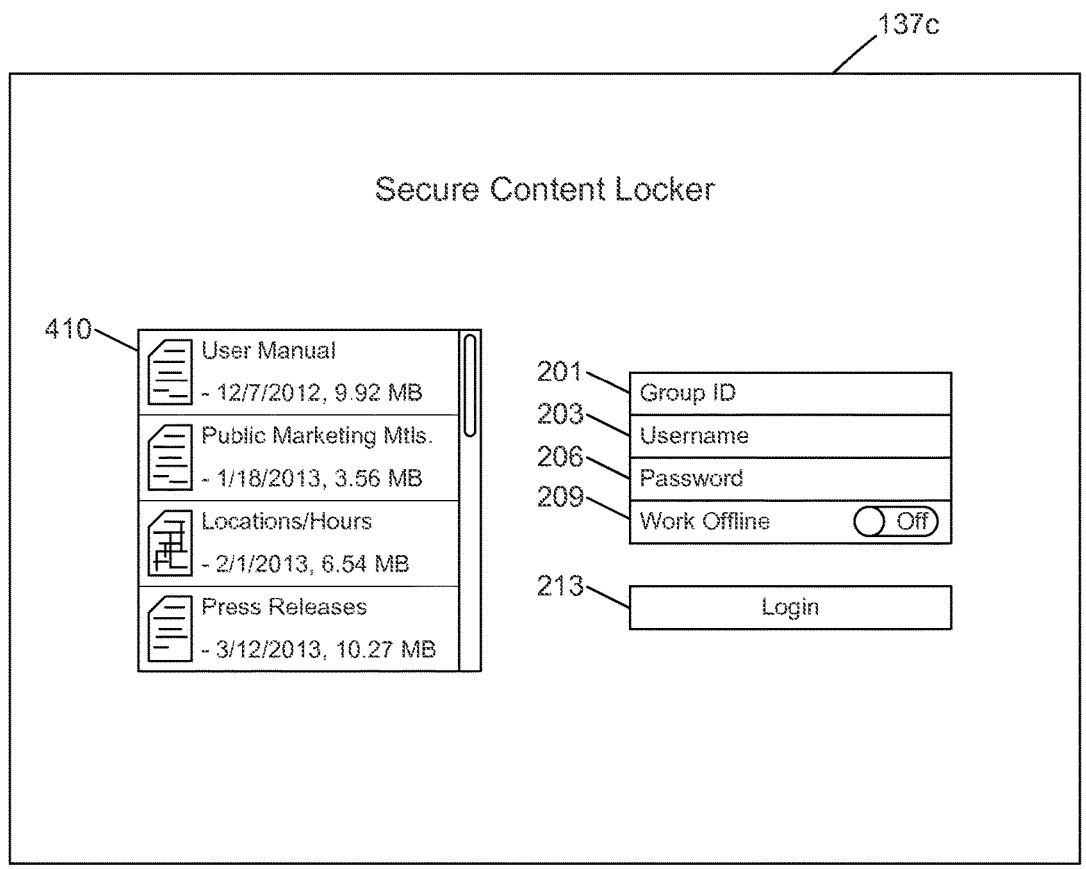

In different embodiments, once the client side application 126 is invoked, a request 177 for access to unsecure resources 165a may be automatically generated and transmitted to the distribution service 174, without an instant login button 215 being activated. In other words, the automatically generated request 177 will include the device identifier 135 but no user credential 132. In these embodiments, an initial user interface 137c may be presented to the user upon invoking the client side application 126, as shown in FIG. 4. User interface 137c shows a list 410 of unsecure resources 165a available to the client device 120 and provides input fields (group ID input field 201, username input field 203, password input field 206) for imputing user credentials 132, in case the user wants to login for access to more secure resources 165b.

Figure 5:
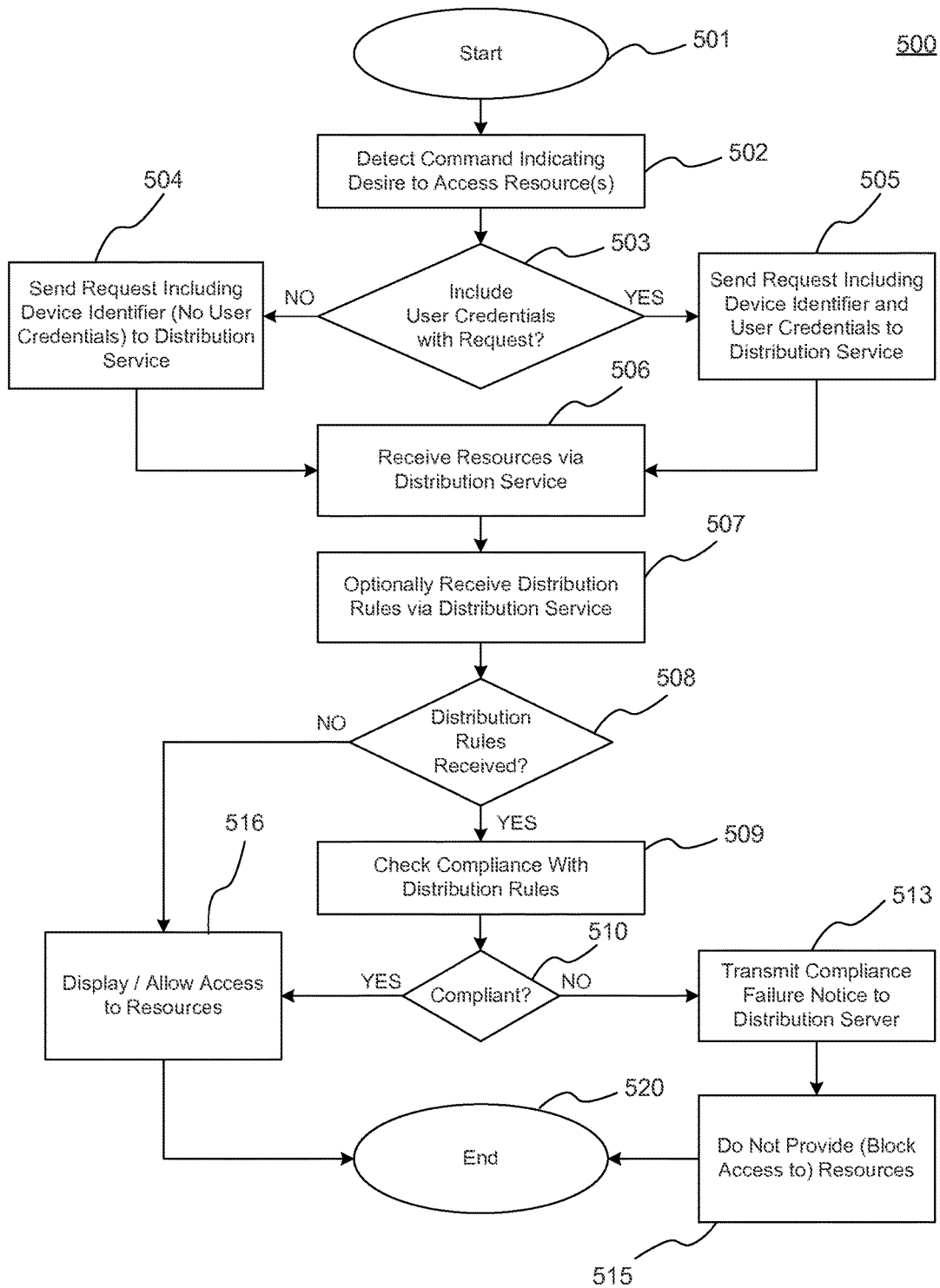
FIG. 5 is a flowchart illustrating functionality performed by a client side application in the networked environment of FIG. 1.

FIG. 5 is a flowchart Illustrating example functionality performed by a client side application 126 when performing a method for accessing variably secure resources 165 via a distribution service 174. Note that depending on the embodiment, the functionality performed by the client side application 126 may involve more or fewer steps than shown in the figure. The method begins at starting block 501 and proceeds to block 502, where the client side application 126 detects a command indicating a desire to access resources 165 via the distribution service 174. As mentioned, this command may be input by a user via a user interface 137a&c and/or may be automatically generated by the client side application when it is launched. At block 503, the client side application 126 determines whether a request 177 to access resources should include at least one user credential 132. User credentials 132 will be included with the request 177 when the user inputs the user credentials 132 via the user interface 137a&c and/or when the user credentials are otherwise automatically retrieved from the data store 122 of the client device. If user credentials 132 are not supplied, the method moves from block 503 to block 504 where a request 177 for access to resources 165 is sent from the client device 120 to the distribution service 174, wherein the request 177 includes a device identifier 135 but no user credentials 132. On the other hand, if user credentials 132 are supplied, the method moves from block 503 to block 5045 where a request 177 for access to resources 165 is sent from the client device 120 to the distribution service 174, wherein the request 177 includes a device identifier 135 and at least one user credential 132. In either case, the request 177 for access may also include information from the device profile 123 and other pertinent information.

At block 506, the client device 120 may receive and/or receive access to at least one resource 165. If the request 177 for access included at least one user credential 132, the received resources 165 may include unsecure resources 165a and/or secure resources 165b; otherwise the received resources 165 will include only unsecure resources 165a. At block 507, the client device may optionally receive at least one distribution rule 171 associated with the received resources 165. As described, distribution rules 171 may be provided to the client device 120 in embodiments where the client side application 126 is itself required to determine whether the client device 120 is in compliance with such rules and, thus, whether the client side application 126 is permitted to display and/or allow the user to interact with the associated resources 165. In block 165, a determination is made as to whether any distribution rules 171 have been received in association with the applicable resources. If not, the method proceeds to block 516, where the applicable resource(s) 165 are displayed and/or the user is otherwise provided access to such resources 165.

If it is determined in block 508 that distribution rules 171 have been received in association with the applicable resources, the method moves to block 509 where the client side application 126 verifies the client device's 120 compliance with such distribution rules 171 (e.g., based on the client device profile 123). If it is determined at block 510 that the client device 120 does not comply with the distribution rule(s) 171, the client side application 126 causes the client device 120 to transmit appropriate failure notifications to the distribution service 174 at block 513 and the client side application 126 refrains from displaying, and/or blocks access to, the applicable resources 165 at block 515. However, if it is determined at block 510 that the client device 120 is in compliance, then at block 516 the applicable resources 165 are displayed to the user. From either block 515 or block 516, the example method ends at block 520.

Figure 6:
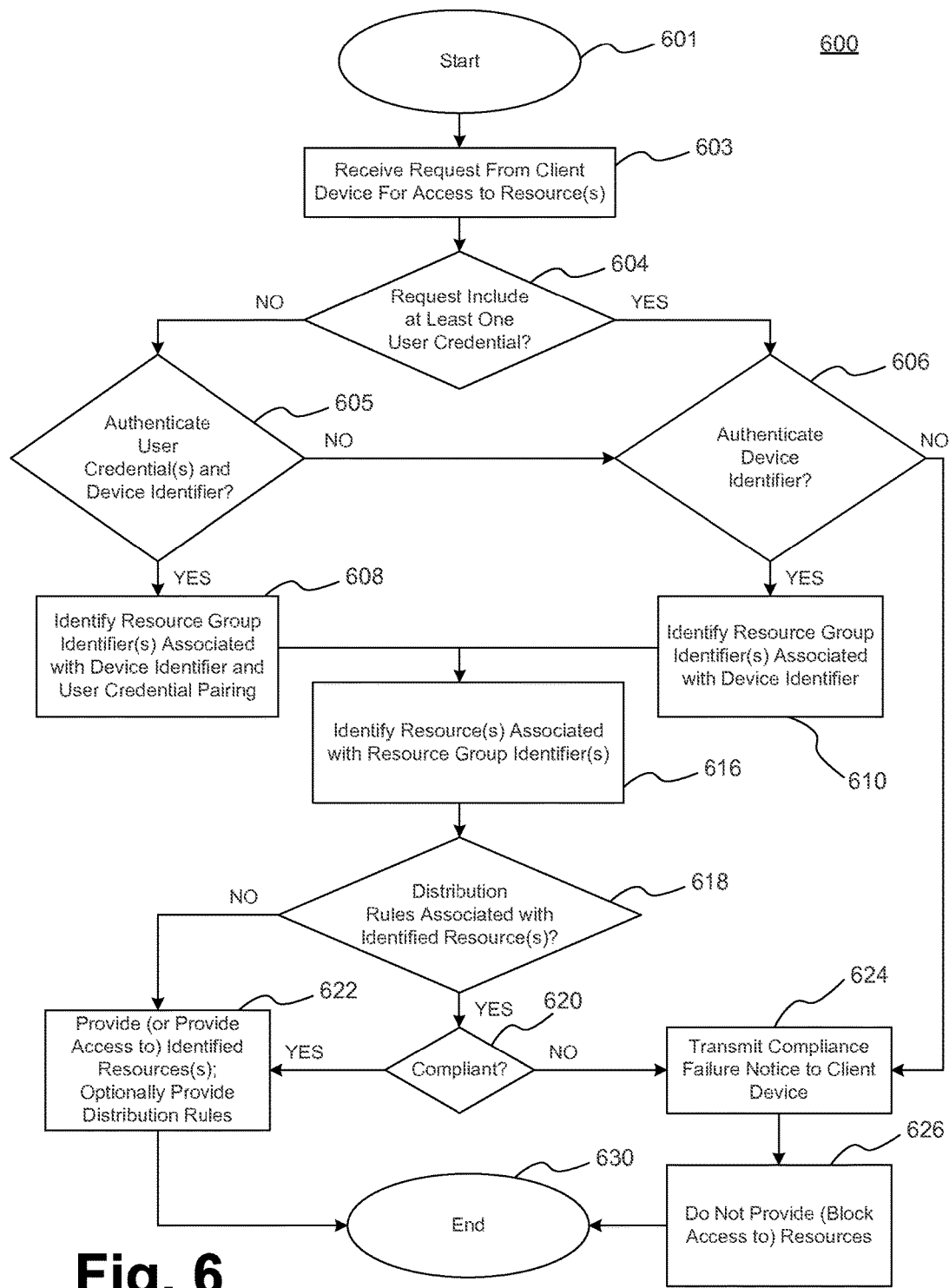
FIG. 6 is a flowchart illustrating functionality performed by a distribution service in the networked environment of FIG. 1.

FIG. 6 is a flowchart Illustrating example functionality performed by distribution service 174 when performing a method for controlling access to variably secure resources 165. Note that depending on the embodiment, the functionality performed by the distribution service 174 may involve more or fewer steps than shown in the figure. The method begins at starting block 601 and proceeds to block 603, where the distribution service 174 receives from a client device 120 a request 177 for access to resources 165. At block 604, the distribution service 174 determines whether the request 177 includes at least one user credential 132 along with a device identifier 135.

If it is determined at block 604 that the request 177 for access includes at least one user credential 132, the method moves to block 605 where the user credential(s) 132 and the device identifier are authenticated to determine if the user and the particular client device 120 are authorized to access certain resources 165. If it is determined at block 605 that the user and the client device are authorized, then at block 608 the distribution service 174 identifies which of a plurality of resource grouping identifiers 168 are associated with the device identifier 135 and user credential 132 pairing. If it is determined at block 605 that the user is not authorized to access any resources 165, or if it is determined in step 604 that no user credential 132 is included in the request 177, the method moves to block 606 where the device identifier 135 is authenticated to determine if the particular client device 120 is authorized to access certain resources 165. If it is determined at block 606 that the client device 120 is not authorized to access any resources 165, the distribution service 174 transmits an appropriate failure notification to the client device 120 at block 624 and refrains from providing, and/or blocks access to, the resources 165 at block 626. However, if it is determined at block 606 that the client device 120 is authorized to access some of the resources 165, then at block 610 the distribution service 174 identifies which of a plurality of resource grouping identifiers 168 are associated with the device identifier 135.

After identifying resource grouping identifiers 168 at either block 608 or block 610, the method proceeds to block 616, where the distribution service 174 identifies which of a plurality of resources 165 are associated with the identified resource grouping identifiers 168. Then at block 618, the distribution service 174 determines if there are any distribution rules 171 associated with the identified resources 165. If not, the distribution service provides, and/or provides access to, the identified resources at block 622. If there are distribution rules 171 associated with the identified resources 165, the method proceeds to block 620, where the distribution service 174 determines whether the client device 120 complies with the distribution rules 171. This may occur by comparing some and/or all of the device profile 123 (status data) received from the client device 120 to at least one of the distribution rules 171. If the status data does not comply with the distribution rule(s) 171, then the distribution service 174 transmits appropriate failure notifications to the client device 120 at block 624 and refrains from providing, and/or blocks access to, the identified resources 165 at block 626. However, if the distribution rule(s) 171 are satisfied, then the distribution service provides, and/or provides access to, the identified resources at block 622. In certain embodiments, distribution rule(s) 171 may also be provided to the client device 120 at block 622 to enable the client side application 126 to monitor for continued compliance by the client device 120. From block 622 or block 624, the example method ends at block 630.

Figure 7:
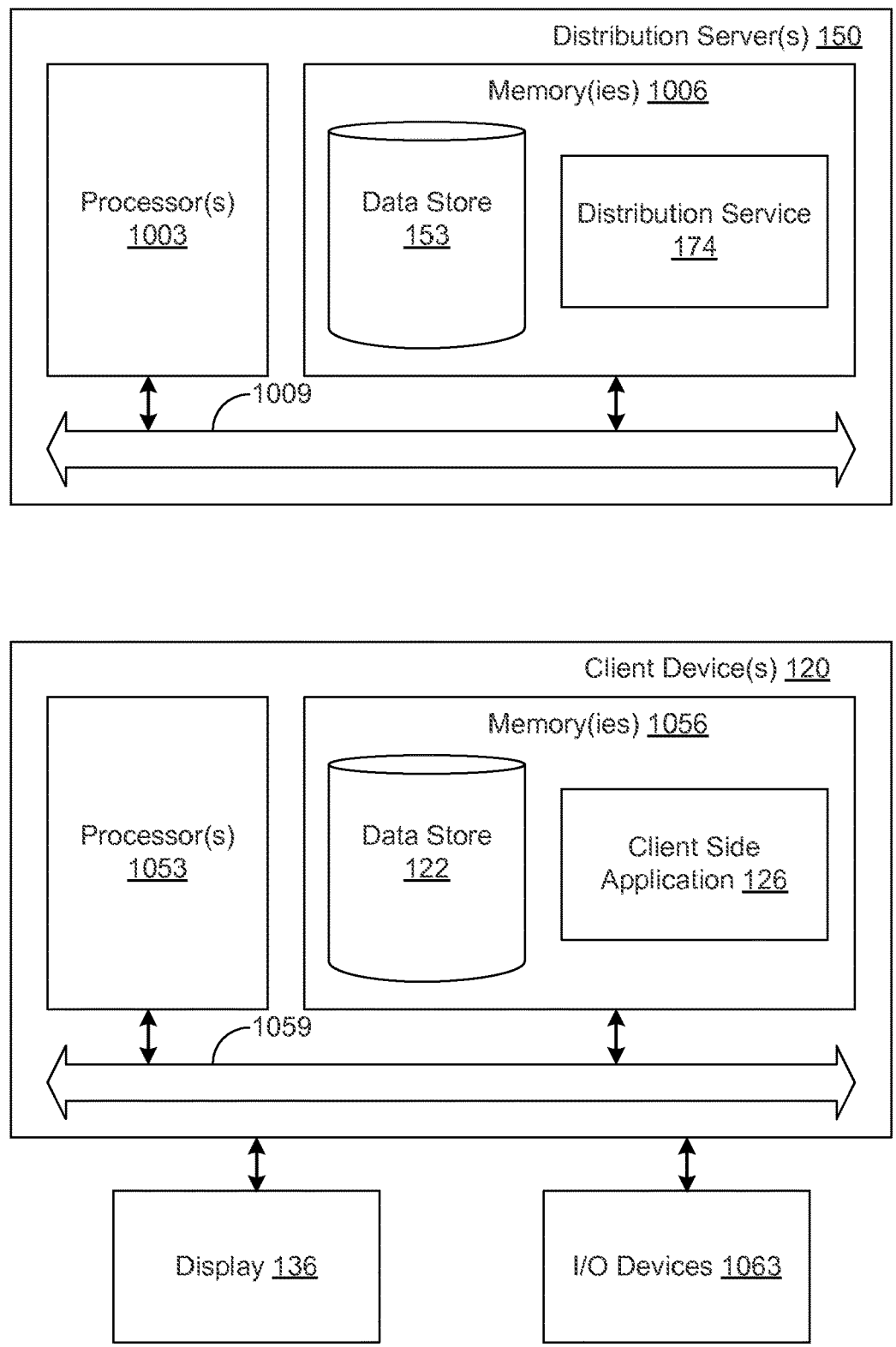
FIG. 7 shows schematic block diagrams illustrating a distribution server and client device employed in the networked environment of FIG. 1.

FIG. 7 shows schematic block diagrams of an example distribution server 150 and an example client device 120 according to an embodiment of the present disclosure. The distribution server 150 includes at least one processor circuit, for example, having a processor 1003 and a memory 1006, both of which are coupled to a local interface 1009. To this end, the distribution server 150 may comprise, for example, at least one server computer and/or like device. Similarly, the client device 120 includes at least one processor circuit, for example, having a processor 1053 and a memory 1056, both of which are coupled to a local interface 1059. Additionally, the client device 120 may be in data communication with a display 136 for rendering user interfaces 137 (FIG. 1) and at least one other I/O device 1063 for inputting and outputting data. To this end, the client device 120 may comprise, for example, at least one client computer and/or like device.

The following is a general discussion of the components of the distribution server 150 and the client device 120. The local interface 1009 and 1059 may comprise, for example, a data bus with an accompanying address/control bus and/or other bus structure as can be appreciated. Stored in the memory 1006 and 1056 are both data and several components that are executable by the processors 1003 and 1053. In particular, with regard to the distribution server 150, stored in the memory 1006 and executable by the processor 1003 are a distribution service 174 and potentially other applications. Additionally, with regard to the client device 120, stored in the memory 1056 and executable by the processor 1053 are a client side application 126 and potentially other applications. Also stored in the memory 1006 and 1056 may be a data store 153 and 122 and other data. In addition, an operating system may be stored in the memory 1006 and 1056 and executable by the processor 1003 and 1053.

It is to be understood that there may be other applications that are stored in the memory 1006 and 1056 and are executable by the processor 1003 and 1053 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, and/or other programming languages.

A number of software components are stored in the memory 1006 and 1056 and are executable by the processor 1003 and 1053. In this respect, the term "executable" means a program file that is in a form that can ultimately be run by the processor 1003 and 1053. Examples of executable programs may be, for example, a compiled program that can be translated into machine code in a format that can be loaded into a random access portion of the memory 1006 and 1056 and run by the processor 1003 and 1053, source code that may be expressed in proper format such as object code that is capable of being loaded into a random access portion of the memory 1006 and 1056 and executed by the processor 1003 and 1053, and/or source code that may be interpreted by another executable program to generate instructions in a random access portion of the memory 1006 and 1056 to be executed by the processor 1003 and 1053, etc. An executable program may be stored in any portion and/or component of the memory 1006 and 1056 including, for example, random access memory (RAM), read-only memory (ROM), hard drive, solid-state drive, USB flash drive, memory card, optical disc such as compact disc (CD) and/or digital versatile disc (DVD), floppy disk, magnetic tape, and/or other memory components.

The memory 1006 and 1056 are defined herein as including both volatile and nonvolatile memory and data storage components. Volatile components are those that do not retain data values upon loss of power. Nonvolatile components are those that retain data upon a loss of power. Thus, the memory 1006 and 1056 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Also, the processor 1003 and 1053 may represent multiple processors, and the memory 1006 and 1056 may represent multiple memories that operate in parallel processing circuits, respectively. In such a case, the local interface 1009 and 1059 may be an appropriate network 110 (FIG. 1) that facilitates communication between any two of the multiple processors 1003 and 1053, and/or between any two of the memory 1006 and 1056, etc. The local interface 1009 and 1059 may comprise additional systems designed to coordinate this communication, including, for example, performing load balancing. The processor 1003 and 1053 may be of electrical and/or of some other available construction.

Although the distribution service 174, client side application 126, and other various systems described herein may be embodied in software and/or code executed by general purpose hardware as discussed above, as an alternative the same may also be embodied in dedicated hardware and/or a combination of software/general purpose hardware and dedicated hardware. If embodied in dedicated hardware, each can be implemented as a circuit and/or state machine that employs any one of and/or a combination of a number of technologies. These technologies may include, but are not limited to, discrete logic circuits having logic gates for implementing various logic functions upon an application of at least one data signal, application specific integrated circuits having appropriate logic gates, and/or other components, etc. Such technologies are generally well known by those skilled in the art and, consequently, are not described in detail herein.

The flowcharts of FIGS. 5 and 6 show certain functionality and operations performed by the distribution service 174 and client side application 126, respectively. If embodied in software, each box may represent a module, segment, and/or portion of code that comprises program instructions to implement the specified logical function(s). The program instructions may be embodied in the form of source code that comprises human-readable statements written in a programming language and/or machine code that comprises numerical instructions recognizable by a suitable execution system such as a processor 1003 and 1053 in a computer system and/or other system. The machine code may be converted from the source code, etc. If embodied in hardware, each block may represent a circuit and/or a number of interconnected circuits to implement the specified logical function(s).

Although the flowcharts of FIGS. 5 and 6 show a specific order of execution, it is understood that the order of execution may differ from that which is depicted. For example, the order of execution of two or more steps may be scrambled relative to the order shown. Also, two or more blocks shown in succession in FIGS. 8 and 9 may be executed concurrently and/or with partial concurrence. Further, in some embodiments, at least one of the steps shown in FIGS. 5 and 6 may be skipped or omitted. In addition, any number of counters, state variables, warning semaphores, and/or messages might be added to the logical flow described herein, for purposes of enhanced utility, accounting, performance measurement, and/or providing troubleshooting aids, etc. It is understood that all such variations are within the scope of the present disclosure.

Also, any logic and/or application described herein, including the distribution service 174 and the client side application 126, that comprises software and/or code can be embodied in any non-transitory computer-readable medium for use by and/or in connection with an instruction execution system such as, for example, a processor 1003 and 1053 in a computer system and/or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, and/or maintain the logic and/or application described herein for use by and/or in connection with the instruction execution system. The computer-readable medium can comprise any one of many physical media such as, for example, magnetic, optical, and/or semiconductor media. More specific examples of a suitable computer-readable medium would include, but are not limited to, magnetic tapes, magnetic floppy diskettes, magnetic hard drives, memory cards, solid-state drives, USB flash drives, and/or optical discs. Also, the computer-readable medium may be a random access memory (RAM) including, for example, static random access memory (SRAM) and dynamic random access memory (DRAM), and/or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), and/or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method comprising:
   receiving a request from an application executing on a client device to access a first set of resources and a second set of resources;
   determining that the first set of resources is associated with a first distribution rule that permits the first set of resources being rendered while the client device is not in communication with a distribution service;
   determining that the second set of resources is associated with a second distribution rule that prohibits the second set of resources being rendered while the client device is not in communication with the distribution service;
   detecting whether the client device is in communication with the distribution service; and
      in response to receiving the request and detecting that the client device is not in communication with the distribution service:
         denying the application access to the second set of resources according to the second distribution rule; and
         permitting the application access to the first set of resources according to the first distribution rule.

2. The method of claim 1, wherein:
   the first set of resources is not associated with a user credential requirement; and
   the second set of resources is associated with the user credential requirement.

3. The method of claim 1, wherein:
   the first set of resources is not associated with a device identifier requirement; and
   the second set of resources is associated with the device identifier requirement.

4. The method of claim 1, wherein:
   the request is received in the client device; and
   detecting whether the client device is in communication with the distribution service comprises parsing client device profile data.

5. The method of claim 1, wherein data included within the request comprises:
   a device identifier that identifies the client device; and
   a credential that identifies a user of the client device.

6. The method of claim 1, wherein detecting whether the client device is in communication with the distribution service comprises detecting whether the client device is connected to a network.

7. A method, comprising:
   receiving a request from an application executing on a client device to access a first resource and a second resource;
   identifying a first authorization requirement associated with the first resource, wherein the first authorization requirement permits the first resource being rendered when the client device is not in communication with a distribution service;
   identifying a second authorization requirement associated with the second resource, wherein the second authorization requirement prohibits the second resource being rendered when the client device is not in communication with the distribution service;
   detecting whether the client device is in communication with the distribution service; and
   in response to receiving the request and detecting that the client device is not in communication with the distribution service, permitting the application access to the first resource according to the first authorization requirement and prohibiting the application access to the second resource according to the second authorization requirement.

8. The method of claim 7, wherein the method further comprises:
   detecting whether at least one of the first resource or the second resource is associated with at least one distribution rule.

9. The method of claim 7, wherein the method further comprises:
   detecting if a user credential associated with the client device is associated with at least one distribution rule; and
   in response to the user credential being associated with the at least one distribution rule, sending the at least one distribution rule to the client device.

10. The method of claim 7, wherein the method further comprises:
    detecting if a device identifier associated with the client device is associated with at least one distribution rule; and
    in response to the device identifier being associated with the at least one distribution rule, sending the at least one distribution rule to the client device.

11. The method of claim 7, wherein the client device operates subject to a plurality of distribution rules, at least one of the plurality of distribution rules defining at least one of the first authorization requirement or the second authorization requirement.

12. The method of claim 7, wherein detecting whether the client device is in communication with the distribution service comprises detecting whether the client device is connected to a network.

13. A non-transitory computer-readable medium encoded with software that, when executed by a computing device, causes the computing device to at least:
receive a request from an application executing on a client device to access a first set of resources and a second set of resources;
identify a first distribution rule associated with the first set of resources, wherein the first distribution rule permits the first set of resources being rendered while the computing device is not in communication with a distribution service;
identify a second distribution rule associated with the second set of resources, wherein the second distribution rule prohibits the second set of resources being rendered while the computing device is not in communication with the distribution service;
detect whether the computing device is in communication with the distribution service; and
in response to receiving the request and detecting that the computing device is not in communication with the distribution service, permitting the application access to the first set of resources according to the first distribution rule and denying the application access to the second set of resources according to the second distribution rule.

14. The non-transitory computer-readable medium of claim 13, wherein the software is further operable to cause the computing device to at least:
receive, from the distribution service, at least one distribution rule associated with at least one of the first set of resources or the second set of resources.

15. The non-transitory computer-readable medium of claim 13, wherein the software is further operable to cause the computing device to at least:
determine to revoke a right to access the :first set of resources or the second set of resources; and
send a notification of revocation to the distribution service.

16. The non-transitory computer-readable medium of claim 15, wherein:
determining to revoke the right to access comprises receiving an unauthorized input from a user.

17. The non-transitory computer-readable medium of claim 15, wherein:
determining to revoke the right to access comprises determining a client device does not comply with at least one distribution rule.

18. The non-transitory computer-readable medium of claim 13, wherein the software further causes the computing device to detect whether the computing device is connected to a network.

* * * * *